(12) United States Patent
Freeman

(10) Patent No.: US 7,823,542 B2
(45) Date of Patent: Nov. 2, 2010

(54) PET TOY

(76) Inventor: Lisa Freeman, 1509C Woodcutter La., Wheaton, IL (US) 60187

( * ) Notice: Subject to any disclaimer, the term of this patent is extended or adjusted under 35 U.S.C. 154(b) by 96 days.

(21) Appl. No.: 12/203,410

(22) Filed: Sep. 3, 2008

(65) Prior Publication Data

US 2009/0056641 A1    Mar. 5, 2009

Related U.S. Application Data

(60) Provisional application No. 60/969,677, filed on Sep. 3, 2007.

(51) Int. Cl.
*A01K 29/00* (2006.01)
(52) U.S. Cl. .................................................. 119/709
(58) Field of Classification Search .................. 119/702, 119/707, 709, 710, 711; 87/3, 4; 40/316, 40/665; 57/210, 236, 200; D30/160
See application file for complete search history.

(56) References Cited

U.S. PATENT DOCUMENTS

| | | | | |
|---|---|---|---|---|
| 4,321,888 A | * | 3/1982 | Topliffe | 119/709 |
| 4,884,807 A | * | 12/1989 | Welch | 473/575 |
| 4,924,811 A | * | 5/1990 | Axelrod | 119/710 |
| 5,092,272 A | * | 3/1992 | O'Rourke | 119/709 |
| 5,357,904 A | * | 10/1994 | Takahashi et al. | 119/708 |
| 5,392,734 A | * | 2/1995 | Laone et al. | 119/710 |
| D371,645 S | * | 7/1996 | Lawson | D30/160 |
| 6,016,771 A | * | 1/2000 | Baiera et al. | 119/708 |
| D436,147 S | * | 1/2001 | Barnes | D21/624 |
| 6,250,254 B1 | * | 6/2001 | Weinacker | 119/709 |
| D465,885 S | * | 11/2002 | Weinacker, Jr. | D30/160 |
| 2004/0200433 A1 | * | 10/2004 | Oblack | 119/707 |

* cited by examiner

*Primary Examiner*—Rob Swiatek
*Assistant Examiner*—Ebony Evans
(74) *Attorney, Agent, or Firm*—Michael Ries

(57) ABSTRACT

Disclosed is a pet toy made of stretchable fabric. The toy includes a loop, a body portion attached to the loop and a bottom with a plurality of cords, called nubbies. The pet toy is made from a variety of fabrics, wherein different sections of the toy are braided, while other sections of the toy are formed into knots and patterned into twirls. The braids and patterns are formed into different patterns and lengths to be used as recreational tools for dogs, cats and even birds, additionally, the braided sections provide an improved gripping surface. Use of the pet tool may also improve gums and teeth of puppies.

12 Claims, 7 Drawing Sheets

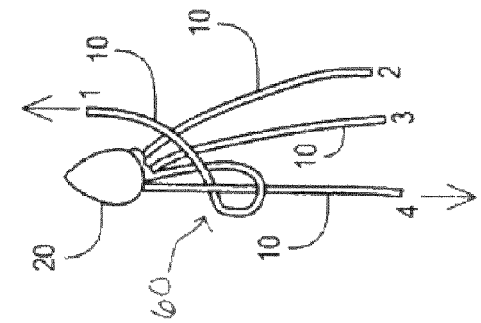
FIG. 1A
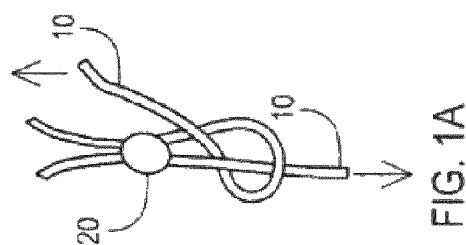
FIG. 1B
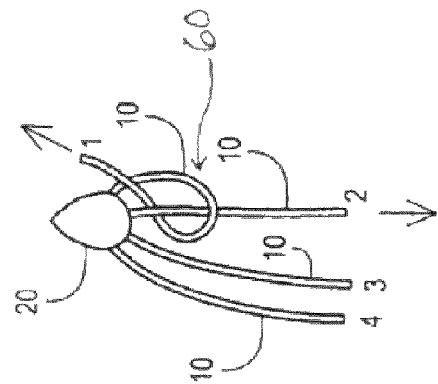

US 7,823,542 B2

PET TOY

This application claims priority to U.S. Provisional Application 60/969,677 filed Sep. 3, 2007, the entire disclosure of which is incorporated by reference.

TECHNICAL FIELD AND BACKGROUND

The present invention relates to a pet toy of a material like fleece or cotton with numerous widths and lengths to be tied into various knots and used as a toy with one's pets. More specifically, the present invention provides a user with a pet toy used with dogs, cats and birds.

The present invention has been shown to allow for creating different lengths of the toy for different types of pets, for example, a longer version may be used for dogs and a shorter may be used for cats and birds.

The pet toy may have a top loop, a thicker body center portion, and bottom having a plurality of thinner cords, called nubbies. The pet toy is typically constructed using six lengths of fabric of similar length and width. The top of the toy is braided and formed onto a loop for the handler to hold while playing with the pet. The body of the toy is created by forming "friendship bracelet" knots in a pattern to create twirls. In the shorter versions of the toy, the body may have one twirl, while in longer versions of the toy, it may have two twirls. At the bottom of the toy, there is a plurality of nubbies. These are created after tying off the six lengths of the fabric and then splitting them into halves. The nubbies are formed by tying these halves together using the same friendship knots. The nubbies can be chewed on by the pet. Another embodiment replaces the nubbies with an additional braided loop at the bottom. The soft material used in the toy may clean gums and help teething puppies. The toy can be used to play tug-of-war and fetch, but is not necessarily intended for chronic chewing.

BRIEF DESCRIPTION OF THE DRAWINGS

The objects, features, and advantages of the present invention will be apparent from the following detailed description of the preferred embodiment of the invention with references to the following drawings.

FIG. 1a is a view of a pet toy and top loop in accordance with the present invention.

FIG. 1b is a view of a pet toy, top loop and knot pattern in accordance with the present invention.

DETAILED DESCRIPTION OF ILLUSTRATIVE EMBODIMENTS

Figure 1C:
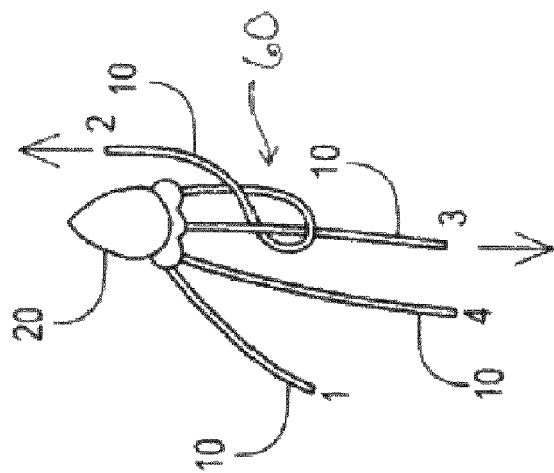
FIG. 1c is a view of a pet toy, top loop and knot pattern in accordance with the present invention.
Figure 1C:
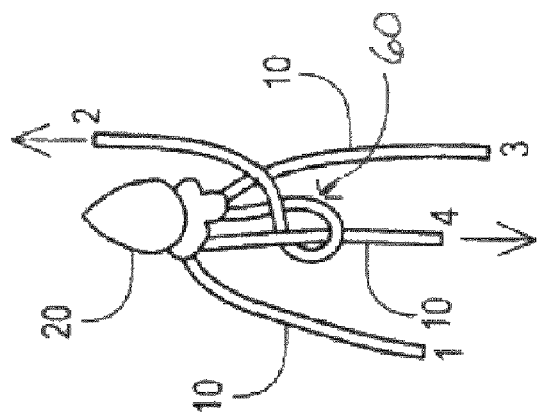
Figure 1C:
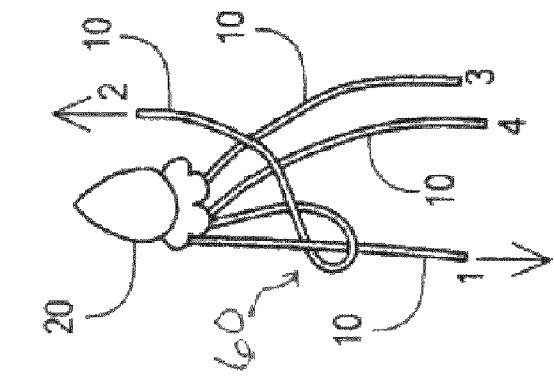

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Referring to FIG. 1a, as in one embodiment is a view of a pet toy 100 and top loop 20 and cords 10. The configuration shows the top loop 20 of the pet toy 100 while two cords are extended in different directions. The cord 10 with the upward arrow shows that the upwardly extended cord 10 is being tied around the downward extended cord 10. The tying action is done from the base of the top loop 20.

Referring to FIG. 1b, as in one embodiment is a view of a pet toy 100, top loop 20, cords 10 and knots 60 forming a pattern for the pet toy 100. Three consecutive figures are shown tying cords 10 into knots 60 from the base of the top loop 20. As shown in FIG. 1b, the cord 10 represented by an arrow in an upward direction and designated as 1, is wrapped around the downwardly extended cord 10 represented as 2 with the arrow extending in a downward direction. The tying action with both cords 10 results in the forming of a knot 60. This first knot 60 is the beginning of a pattern of knots 60. Subsequently, the same cord 10, represented with an arrow given an upward direction, performs a tying action with the next cord 10 that is represented with a downward arrow and designated as 3. The second knot 60 of the beginning pattern of dots is now formed. Further, the same cord 10, represented with an arrow given an upward direction, performs a tying action with the next cord 10 that is represented with a downward arrow and designated as 4. Once again another knot 60 is formed adding to the developing pattern of the pet toy 100 structure. FIG. 1a and FIG. 1b illustrate how the single knots 60 are formed from the base of the top loop 20 of the pet toy 100 as a result of tying action between two cords 10.

Referring to FIG. 1c, as in one embodiment is a view pet toy 100, top loop 20, and cords 10, wherein the cords 10 form knots 10 and a knot 10 pattern. FIG. 1c adds to the development of the knotting 10 pattern from the base of the top loop 20. The tying action of FIG. 1c is similar to the tying action of FIG. 1b. FIG. 1c uses a different cord 10 to accomplish the tying task of two cords, this cord 10 is shown with an upwardly directed arrow and designated as 2 and another cord 10 with a downwardly directed arrow designated as 3 completes the tying process of another set of knots 60 further developing the knot 60 pattern of the pet toy 100. The knot 60 tying action is performed in the same manner until the knot 60 pattern is completed.

Figure 2B:
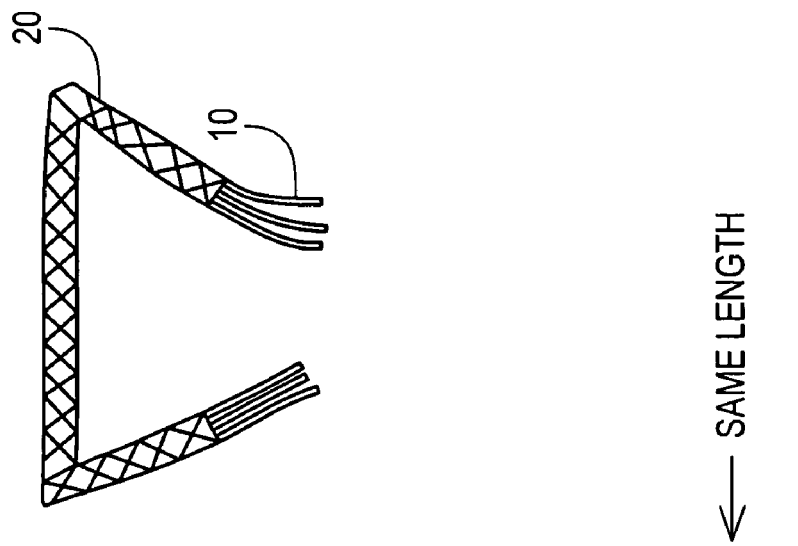
FIG. 2b is a view of a braid and a plurality of strands in accordance with the present invention.
Figure 2A:
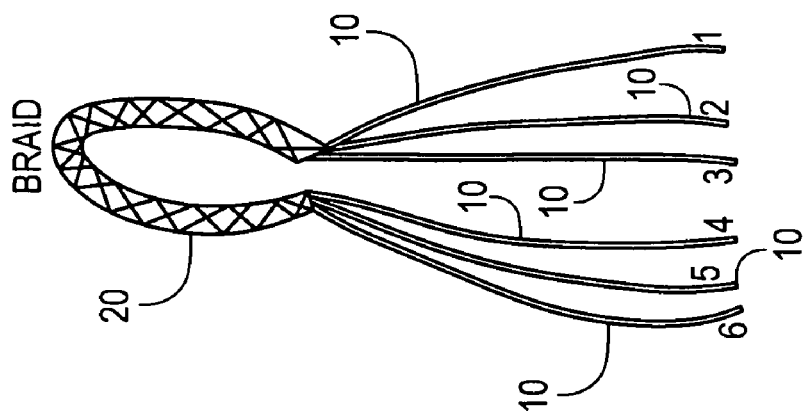
FIG. 2a is a view of an initiation of a braid and plurality of strands in accordance with the present invention.

Referring to FIG. 2a, as in one embodiment is a view of an initiation of a braid and plurality of strands/cords 10. An initial starting point for the braid is shown. The braid becomes the top loop 20 or a bottom loop (not shown) once braided. Before the top loop 20 is braided the six strands/cords 10 are separated into two groups of three strands/cords 10 in order to facilitate braiding of the pet toy 100.

Referring to FIG. 2b, as in one embodiment is a view of a braid and a plurality of strands 10 that are freestanding and separated into two groups of same length. FIG. 2b illustrates the strands/cords 10 before they are substantially terminated becoming the top loop 20.

Figure 3B:
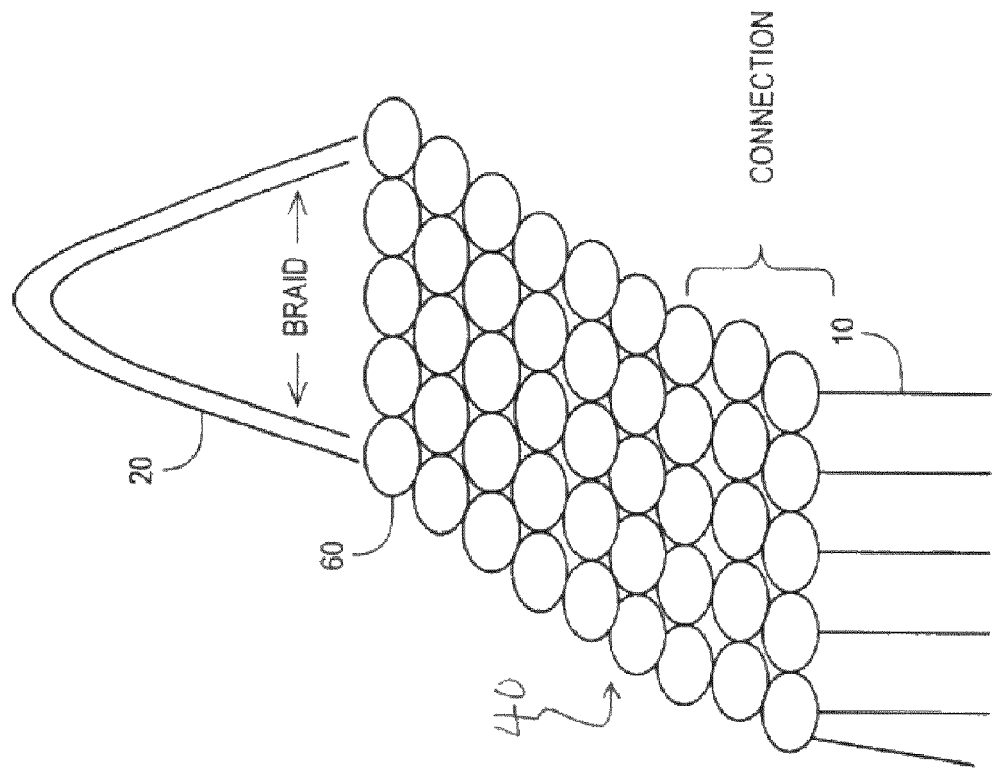
FIG. 3b is a view of a braid and a plurality of strands and knots in accordance with the present invention.
Figure 3A:
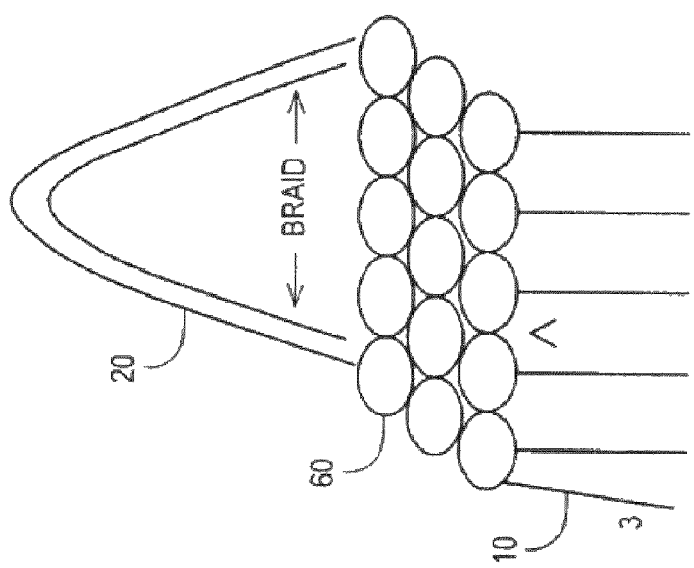
FIG. 3a is a view of a braid and a plurality of strands and knots in accordance with the present invention.

Referring to FIG. 3a, as in one embodiment is a view of a braid and a plurality of strands/cords 10 and knots 60.

Referring to FIG. 3b, as in one embodiment is another view of a braid and a plurality of strands/cords 10 and knots 60. FIG. 3b shows the development of the braid becoming the top loop 20 and connected to the thicker center body portion that becomes the twirl 40 of the pet toy 100. For example, the connection, as shown in FIG. 3b connects the top loop 20 with the thicker center body of the (the twirl 40) of the pet toy 100.

Figure 4:
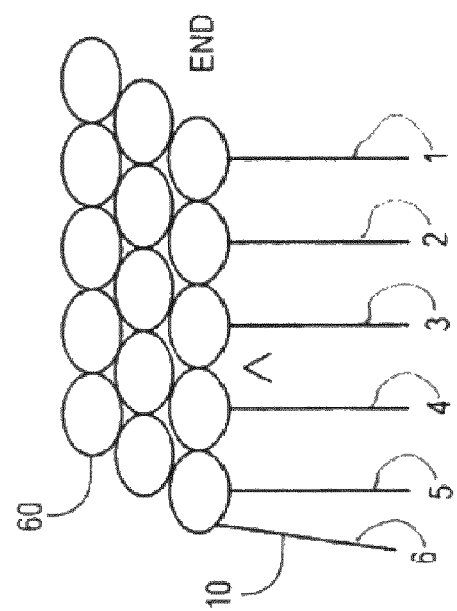
FIG. 4 is a view of a plurality of strands and knots in accordance with the present invention.

Referring to FIG. 4, as in one embodiment is a view of strands/cords 10 and knots 60 at the last stage of developing the knot pattern of the pet toy 100. For example, referring to FIG. 4, place strand 4 over strand 5, and also place strand 4 over strand 6. Then tie strands 4 and 1 into a knot 60 and cut all strips of the strands 10 in half. Then tie the nubbies 50 together.

Figure 5:
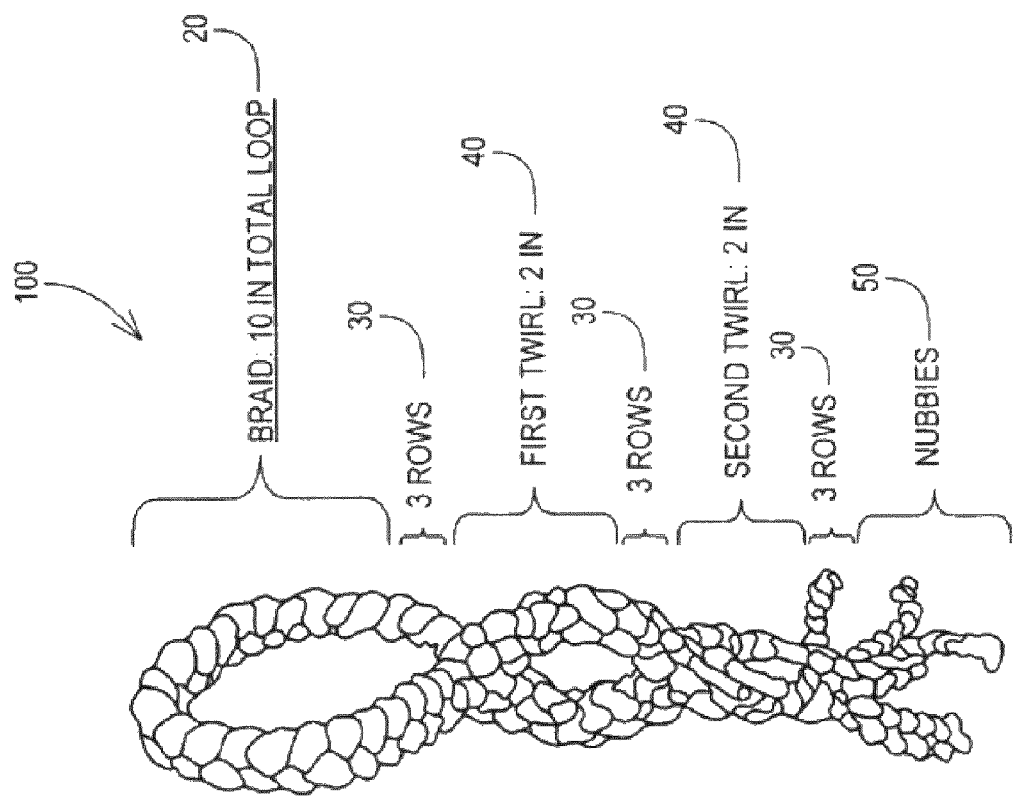
FIG. 5 is a view of a large version of the pet toy in accordance with the present invention.

Referring to FIG. 5, as in one embodiment is a view of a large version of the pet toy 100. The large version of the pet toy 100 comprises the braided top loop 20, three knotted rows 30 connecting the braided top loop 20 and a first twirl 40, a second set of three knotted rows 30 connecting the bottom of the first twirl 40 and the top of a second twirl 40, and a third set of knotted rows 30 connecting the bottom of the second twirl 40 and freestanding nubbies 50. Shorter versions of the pet toy 100 are not shown. Further, neither the short pet toy 100 version or the long pet toy 100 version with a bottom braided loop are shown.

Figure 6:
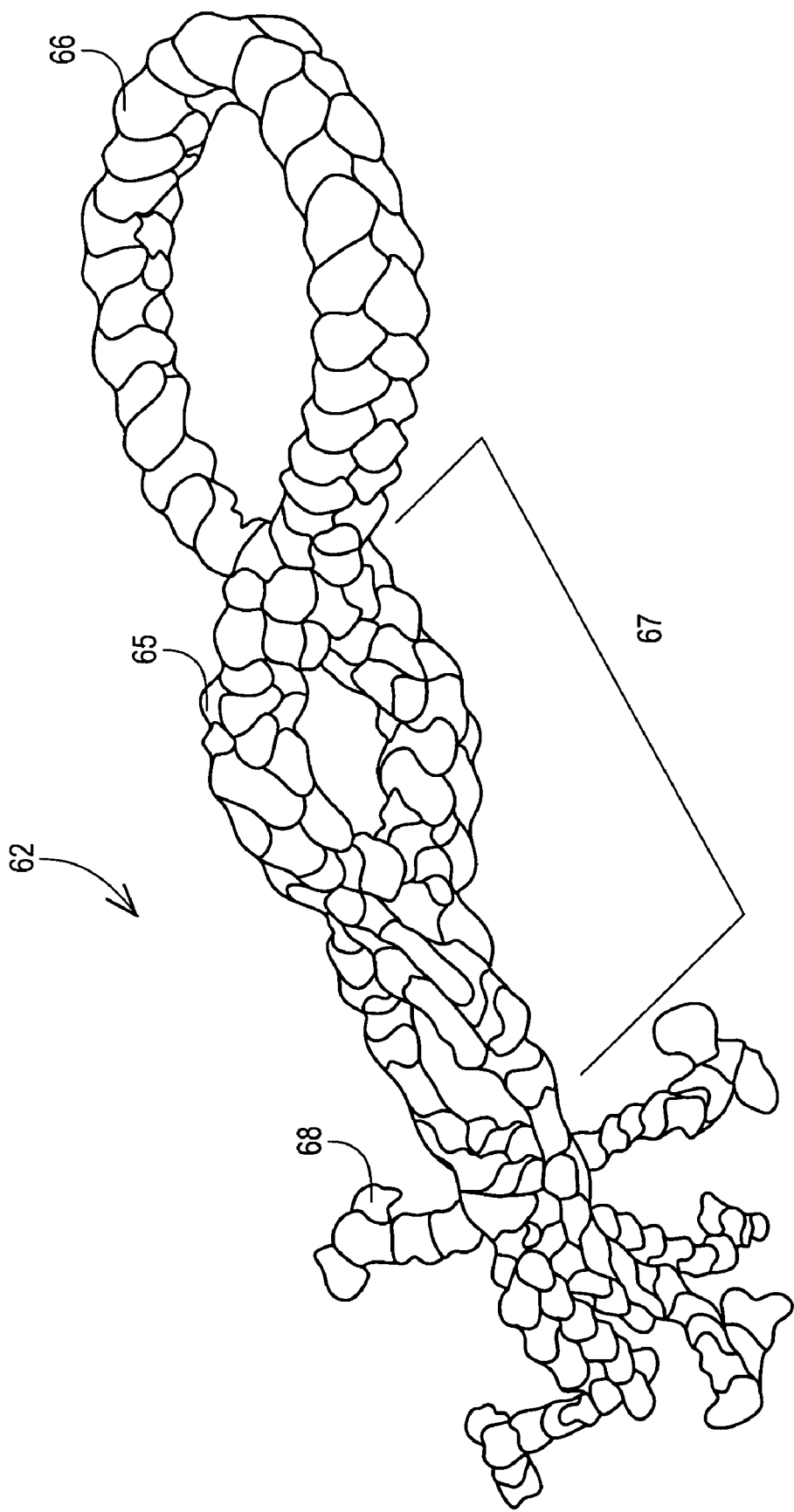
FIG. 6 is a pet toy in accordance with the present invention.

Referring to FIG. 6, as in one embodiment is a traditional toy 62. The traditional toy 62 may come in different sizes for example small traditional, medium, large or x-large big daddy. The traditional toy 62 has a traditional toy loop 66 and a traditional mid section 67 that has at least one twirl 65. The traditional toy 62 has at least one nubby cord 68 that may have bells at the opposite end from the traditional toy loop 66.

Figure 7:
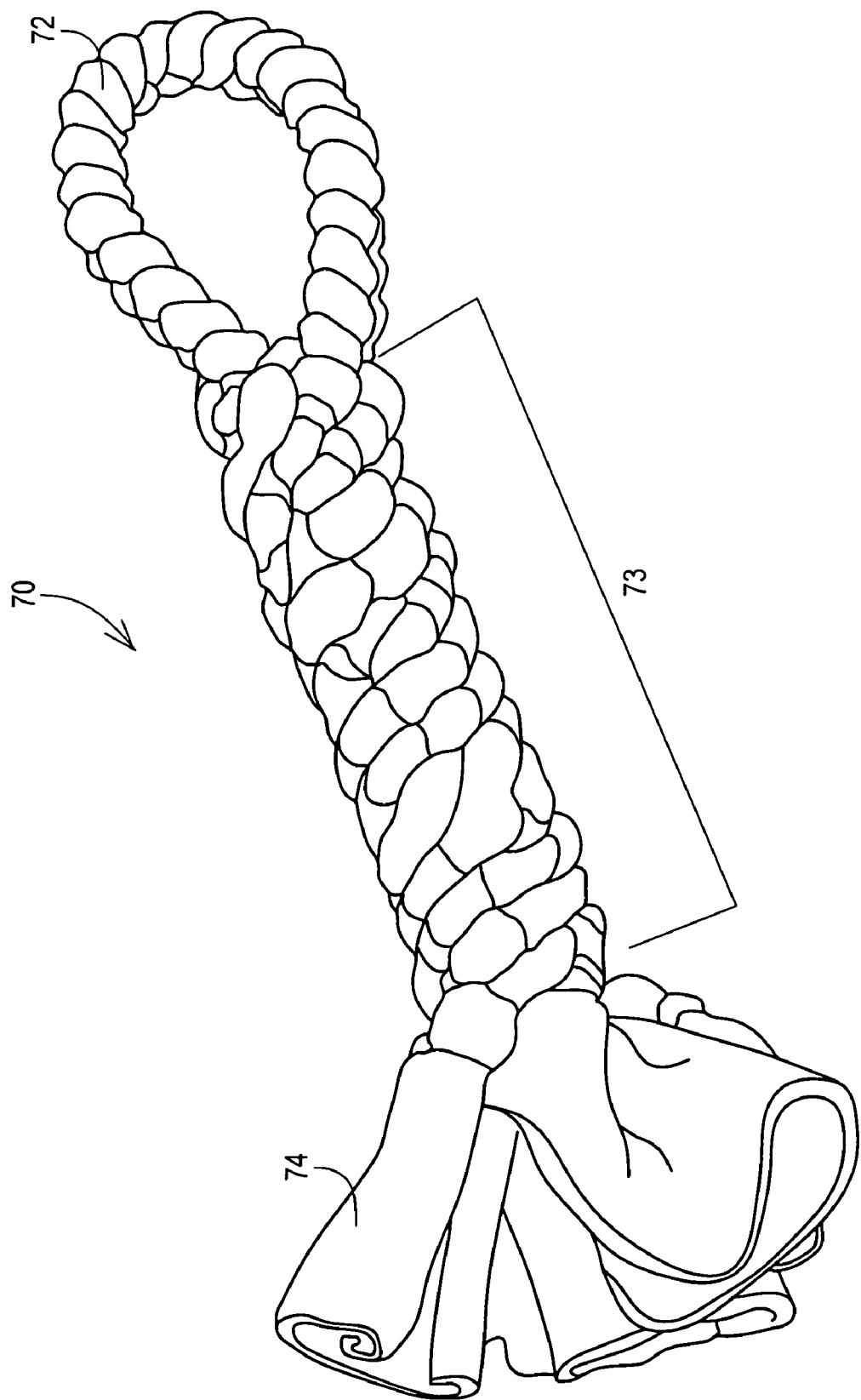
FIG. 7 is a view of a pet toy in accordance with the present invention.

Referring to FIG. 7, as in one embodiment is a spiral toy 70. The spiral top 70 may come in different sizes for example small traditional, medium, large or x-large big daddy. The spiral toy 70 has a spiral toy loop 72 and a spiral mid section 73 that is tightly knotted. The spiral toy 70 has at least one flared cord 74 at the opposite end from the spiral toy loop 72. The start on the spiral toy loop 72 is the same as in FIG. 3a. After FIG. 3a, knots are continued in the same fashion as in FIG. 3a for 10 knots at a time using a single strand. Then 10 knots with the next strand, and so forth. Drawing 3b would not have a center hole. The nubbies are not knotted and have uncut material at the bottom. The spiral toys are tubular in shape and the traditional toys are figure-8 in shape (smalls being O-in shape).

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A pet toy comprising:
a body made of a soft stretchable fabric, the body having a top loop, a bottom portion, and a body center portion connecting the top loop and bottom portion, the bottom portion having a plurality of cords, the cords including nubbies that define the bottom portion, wherein the body center portion is created by forming knots in a pattern to create a spiral body, wherein the spiral body is defined throughout the full length between the top loop and the bottom portion by a single spiral, and wherein the body center portion is defined by at least 45 knots.

2. The pet toy of claim 1 wherein the pet toy has six lengths of fabric of same length and width.

3. The pet toy of claim 1 wherein the fabric is a selected one of fleece and cotton.

4. The pet toy of claim 1 wherein the top loop is used as a handle while playing with pets.

5. The pet toy of claim 1 wherein the bottom of the toy has a plurality of nubbies and beads.

6. The pet toy of claim 5 wherein bells are added to the nubbies.

7. The pet toy of claim 1, wherein the nubbies are created after tying off the six lengths of fabric and splitting them into halves.

8. The pet toy of claim of claim 1, wherein the nubbies help clean gums of puppies and help teething puppies.

9. A method of making a pet toy comprising:
providing six lengths of fabric of similar length and width;
creating a top loop of the toy by braiding and forming the top loop out of the six lengths of fabric of similar length and width, the top loop for a handler to hold while playing with a pet;
creating a body of the toy by forming friendship bracelet knots in a pattern to create a single spiral out of the six lengths of fabric of similar length and width; and
creating a plurality of nubbies at a bottom of the toy by tying off the six lengths of the fabric and then splitting them into halves, the nubbies are formed by tying these halves together using the friendship knots, the nubbies can be chewed on by the pet.

10. The method of making a pet toy of claim 9 wherein the at least one twirl is knotted tightly together leaving no open space.

11. The method of making a pet toy of claim 9 wherein the single spiral does not have a center hole.

12. The method of making a pet toy of claim 9, wherein the single spiral is defined by at least 45 knots.

* * * * *